United States Patent [19]

Petersen et al.

[11] Patent Number: 4,537,638

[45] Date of Patent: Aug. 27, 1985

[54] METHOD FOR REMOVAL OF UNDESIRABLE ORGANIC MATTER

[75] Inventors: Arthur W. Petersen, Chatham Township, Morris County; Dennis T. Smialowicz, Waldwick, both of N.J.

[73] Assignee: American Cyanamid Co., Stamford, Conn.

[21] Appl. No.: 617,156

[22] Filed: Jun. 6, 1984

Related U.S. Application Data

[63] Continuation-in-part of Ser. No. 458,229, Jan. 17, 1983, abandoned.

[51] Int. Cl.³ .......................... B08B 3/08; C09D 9/00

[52] U.S. Cl. .......................................... 134/2; 134/19; 134/38; 134/40; 252/542; 252/DIG. 8

[58] Field of Search .............. 134/2, 38, 40, 19, 22.19; 252/542, 524, DIG. 8, 160

[56] References Cited

U.S. PATENT DOCUMENTS

| | | | |
|---|---|---|---|
| 2,781,357 | 2/1957 | Mannheimer | 252/542 |
| 3,031,408 | 4/1962 | Perlman et al. | 252/158 |
| 3,819,529 | 6/1974 | Murphy | 252/156 |
| 3,832,235 | 8/1974 | Cooper et al. | 134/38 |
| 4,105,574 | 8/1978 | Culmone et al. | 134/38 |
| 4,190,549 | 2/1980 | Imamura et al. | 252/91 |
| 4,374,744 | 2/1983 | Kawanabe et al. | 134/3 |

OTHER PUBLICATIONS

"The Condensed Chemical Dictionary" Hawley (Ed.), 10th Edition, Van Nostrand Reinhold Co., 1981, pp. 871, 872, 557.

"The American Heritage Dictionary" 2nd College Edition, Houghton Mifflin Co. 1982, p. 249.

*Primary Examiner*—William F. Smith
*Assistant Examiner*—K. M. Hastings
*Attorney, Agent, or Firm*—Charles J. Fickey

[57] ABSTRACT

A method of removing undesirable organic matter, such as food soil, paint, or the like, comprises contacting the organic matter with imidazole, pyrazole, an alkyl or aryl substituted imidazole, an alkyl or aryl substituted pyrazole, or a mixture of two or more thereof. Compositions containing these compounds as the active ingredient are also disclosed.

9 Claims, No Drawings

METHOD FOR REMOVAL OF UNDESIRABLE ORGANIC MATTER

This application is a continuation-in-part of Ser. No. 458,229, filed Jan. 17, 1983, now abandoned.

The removal of undesirable organic matter from various hard surfaces such as metal, ceramics, baked enamel has received a great deal of study. The organic matter referred to herein occurs for example, as soil in ovens, on baking pans and barbecue racks, as finishes, coatings, paints and the like.

Oven soil which contains baked-on fat and other food ingredients is usually cleaned by applying to the soil thickened solutions of one of the caustic metal alkalis, either sodium or potassium hydroxide. The effects of caustic metal alkalis as cleaners and the hazards attendant to their use are disclosed in U.S. Pat. No. 4,105,574. The caustic metal alkalis react with and hydrolyze the fats, converting them at least partially into their sodium or potassium salts, which are water soluble. These water soluble soaps are then washed out of the oven with a wet rag or sponge. Commercial products of this type usually contain up to 5% of the metal hydroxide together with other components such as solvents, wetting agents, etc., which contribute to the efficacy of the product.

Products of the type described, although efficient in their cleaning ability, suffer a number of major disadvantages. They are corrosive and, hence, are severely hazardous to the eyes and skin. Also, the residue after cleaning is slimy due to the saponification reaction and unreacted cleaner, making the task of removing the residue both messy and burdensome.

Non-caustic compositions, i.e. those not containing alkali metal hydroxides, for removal of oven soil are described in U.S. Pat. Nos. 4,236,935; 4,193,886; 4,116,848; and 3,808,051. However, all appear to describe a saponification reaction with the formation of water soluble or dispersible soaps. The residue from the reaction would be washed out with a wet or damp sponge. Heating the composition on the soil to a temperature of at least 250° F. is also necessary for cleaning to occur.

U.S. Pat. No. 3,881,948 also describes a non-caustic composition, based on a polyhydric alcohol and an alkaline acting catalyst. Here the reaction also forms water soluble or water dispersible compounds which must be washed out of the oven. Heating the composition on the soil to a temperature of at least 250° F. is necessary for cleaning to occur.

For the removal of finishes, coatings, paints, and the like, aqueous solutions of alkali metal hydroxides have been used to saponify the fatty acid constituents of the bonding component of the composition, thereby loosening and facilitating the removal thereof. Such products have similar disadvantages to the oven cleaner compositions based on alkali metal hydroxides in that they are corrosive to the eye and skin. These "stripping" compositions generally contain other additives such as water miscible solvents, accelerators, surfactants and thickeners, to aid product performance. For example, U.S. Pat. No. 3,819,529 discloses a paint stripping composition consisting essentially of an inorganic alkaline material selected from the group consisting of alkali metal hydroxides, carbonates, silicates, and phosphates and an alkyl or aryl (having not more than six (6) carbon atoms) substituted imidazole. The substituted imidazole is described as an accelerator. Although the disclosure of this patent is confusing as to necessary components which comprise the stripping composition, it is clear that the substituted imidazole is not the stripping agent, but only acts to increase the rate of attack. It is the strong alkali metal compounds which operate to loosen the paint from the surface.

It is, accordingly, an object of the invention to provide a novel method and novel compositions for the removal of organic matter from surfaces.

It is a further object of the invention to provide novel compositions which are non-caustic, non-corrosive, and essentially non-irritating to the eyes and skin.

It is another object of the invention to provide a novel method and novel compositions which give a relatively dry residue which may be physically removed from the surface by wiping or brushing.

It is yet another object of the invention to provide such novel compositions which are useful in a variety of forms, such as paste, aerosol, and pump spray.

These and other objects and advantages of the instant invention will become apparent from the following detailed description.

The novel method of the invention comprises applying to the undesirable organic matter an amount of imidazole, pyrazole or an alkyl or aryl substituted imidazole or pyrazole, for a time sufficient to loosen the organic matter from the surface, and removing the loosened organic matter from the surface. Compositions containing the imidazole, pyrazole, substituted imidazole or substituted pyrazole as the active ingredient are also within the scope of the invention. Obviously, two or more of these compounds may be used in combination in the method or compositions of the present invention. Compounds falling within the scope of an alkyl or aryl substituted imidazole include, inter alia, 1-methylimidazole, 2-methylimidazole, 4-methylimidazole, 1,2-dimethylimidazole, 2-ethylimidazole, 2-isopropylimidazole, 2-ethyl-4-methylimidazole, 2-phenylimidazole, 4-phenylimidazole, benzimidazole and the like. Compounds falling within the scope of an alkyl or aryl substituted pyrazole include 3-methylpyrazole, 3,5-dimethylpyrazole and the like.

The imidazole, pyrazole, alkyl or aryl substituted imidazole, or alkyl or aryl substituted pyrazole is effective by itself, without the need for a carrier, or additional ingredients, such as the alkali metal compounds required in U.S. Pat. No. 3,819,529, supra, provided only that the compound be in liquid form at use temperature.

Obviously, it is also desirable that the imidazole, pyrazole, substituted imidazole or substituted pyrazole be maintained in contact with the soiled substrate to effectuate maximum cleaning. Accordingly, thickened solutions or suspensions of the compound which may be applied as a paste or via pump spray or aerosol systems would be preferred for many applications, such as in oven cleaning, where the compound must be maintained on an overhead and/or vertical surface. Preparation of these aerosol, pump spray and paste compositions are within the ordinary skill in the art.

When used with a carrier (or carrier plus additional ingredients), the concentration of the imidazole, pyrazole, substituted imidazole or substituted pyrazole may very over a wide range—from as little as about 1%, by weight, to as much as about 99%, by weight. Preferably, the imidazole, pyrazole, substituted imidazole, or substituted pyrazole will comprise about 5 to 25% by weight, of the total composition. Aqueous carriers, or water and water miscible organic solvent mixtures are preferred. It has been found that the aryl substituted and higher alkyl (chain length greater than two (2) carbons) substituted imidazoles and pyrazoles are not very soluble in water and, accordingly, the use of a co-solvent in a composition containing any of these compounds and water may be desirable. Alternatively, a non-aqueous carrier may be used. When the particular compound used is not liquid at a desired use temperature (such as room temperature), these carriers may be used to solubilize the compound, and accordingly the carrier system may be routinely chosen by one skilled in the art taking into consideration the solubility of the particular compound being used in various solvent mixtures, and the intended use. Alternatively, of course, the compound may be applied as a dispersion thereof in a carrier, or in a dry state at, for example, room temperature and the system heated to a temperature sufficient to cause the compound to be solubilized in the carrier or melt, thereby rendering the same "active".

When a thickening agent is desirably used with the compound, for example when the organic matter to be removed is on a non-horizontal surface, any such agent, or mixture of two or more thereof, which is compatible with the imidazole, pyrazole or substituted imidazole or pyrazole (and with other ingredients, in a formulation, if a formulation is used) may be used. Useful organic thickening agents include starch, sodium carboxymethylcellulose, hydroxyethyl cellulose, methocel, and water-soluble polymers such as carboxy vinyl polymer (Carbopols from B. F. Goodrich Chemical Company) and most preferred are Xanthan gums such as Keltrol®, made by Kelco Company. Inorganic colloidal materials, such as Veegum (magnesium aluminum silicates manufactured by R. T. Vanderbilt), are also effective. When used, the thickening agent will typically comprise about 0.1 to 10%, by weight, of the composition, although more or less may be used.

It may also be preferable in certain instances to have present as a component of the composition of the present invention a minor amount of surface active agent which will cause the composition to spread evenly over the surface from which the undesirable organic matter is to be removed, or to form a foam. The surface active agents can be any of those commonly known and used as such. An extensive list of such agents appears in the publication McCutcheon's Detergents & Emulsifiers, 1982 Annual. The agents can be anionic, cationic, nonionic, or amphoteric and should be compatible with the other ingredients and impart the desired surface active properties. When used, the surface active agent will typically comprise about 0.01 to 0.8%, by weight, of the composition, although more or less may be used.

Examples of anionic surfactants include (a) carboxylic acids such as soaps of straight chain naturally occurring fatty acids, chain-substituted derivatives of fatty acids, branched-chain and odd-carbon fatty acids, acids from paraffin oxidation, and carboxylic acids with intermediate linkages; (b) sulfuric esters such as sodium lauryl sulfate, tallow alcohol sulfates and coconut alcohol sulfates; and (c) alkylaryl sulfonates such as sodium dodecylbenzene sulfonate, sodium tridecyl benzene sulfonate, and sodium dodecyl diphenyloxide disulphonate.

Examples of cationic surfactants include (a) non-quaternary nitrogen bases such as amines without intermediate linkages; and (b) quaternary nitrogen bases of the formula:

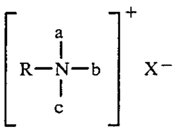

wherein R is a straight-chain alkyl of 12 to 19 carbon atoms, wherein a, b, and c are methyl, ethyl, or benzyl (usually not more than one benzyl group being present), and wherein X is halide such as chloride, bromide or iodide, methylsulfate or ethylsulfate and quaternary ammonium salts such as Hyamine 10X (diisobutylcresoxy ethoxyethyl dimethylbenzyl ammonium chloride monohydrate).

Examples of nonionic surfactants include polyethyleneoxy ethers of alkylphenols, alkanols, esters and polyethyleneoxy compounds with amide links.

In one embodiment of the composition of the invention, a water insoluble, finely divided material is suspended therein to aid in removing the organic matter and residual composition after the organic matter has been loosened from the surface. Although the addition of these materials assist in the removal of varnish, finishes, coatings, paints, and the like, it has been found to be particularly beneficial for the removal of oven soil. In oven cleaning applications, the addition of these materials has been found to contribute to the ease of removal of the organic matter (and residual composition) from the oven surface after the cleaning cycle by wiping with a dry paper towel, a brush or the like. When used, the amount of such finely divided material present in the composition of the present invention typically ranges from about 1 to 25%, by weight, of the composition, preferably about 2 to 10%, although more or less may be used. Examples of such finely divided inorganic material include calcium carbonate, magnesium carbonate, magnesium hydroxide, silica, feldspar, clay and talc.

In another embodiment of the composition of the present invention, a water soluble salt of a strong base and a strong acid is added to the composition containing the imidazole, pyrazole, or substituted imidazole or pyrazole. The addition of the salt has been found to improve the soil loosening activity of the composition and also contributes to the ease of removal of the organic matter and residual composition. Here again, the benefit has been found to be particularly pronounced in oven cleaning applications. When used, the amount of the salt typically ranges from about 1% to 25% by weight, of the composition depending, of course, upon the solubility of the compound being used, and is preferably about 1% to 10%, by weight, of the composition, although more or less may be used. Examples of such water soluble salts include sodium chloride, potassium chloride, sodium sulfate, and potassium sulfate.

Other additives which are typically used in compositions for removal of organic matter may also be used in the compositions of the present invention, provided, of course, that they are compatible therewith. Exemplary of such other additives are humectants, anti-foaming agents, dispersants and the like.

It is an advantage of the method and compositions of the present invention that the same may be employed at room temperature, or at elevated temperatures when speedier cleaning is desired or necessary, such as in oven cleaning applications.

A preferred composition of the present invention for oven cleaning applications is the following:

| Ingredient | Weight Percent |
|---|---|
| Imidazole | 2-25 |
| Keltrol ® | 0.1-0.5 |
| Anionic Surfactant* | 0.01-0.8 |
| $CaCO_3$ | 2-10 |
| Water | qs to 100 |

*For example, Dowfax TM 2A1 (sodium dodecyl diphenyloxide disulfonate), made by Dow Chemical Company.

Preferred compositions of the present invention for other organic coatings, such as polyurethanes, alkyd resins, vinyl resins, and acrylic resins, removal applications are the following:

| Ingredient | Weight Percent | Weight Percent |
|---|---|---|
| Imidazole | 20-25 | 20-25 |
| Keltrol ® | 0.1-0.5 | — |
| Veegum | — | 7-10 |
| Water | qs to 100 | qs to 100 |

The present invention is further illustrated by the following examples. However, it is to be understood that the invention is not to be deemed in any way limited by these examples. All parts and percentages are by weight unless indicated to the contrary.

EXAMPLE 1

A fifty percent chicken fat, fifty percent lard soil composition was baked on a stainless steel plate at 500° F. for 30 minutes. The baking converted the chicken fat and lard into a hard, brown, varnish-like coating, similar in composition and appearance to the fatty soil found in ovens. After cooling, imidazole was applied to the soil, and the plate heated to 300° F. for 60 minutes. The imidazole melted on the soil. During the heating cycle, it was observed that the soil wrinkled and broke away from the metal surface. Upon cooling, the imidazole resolidified with the wrinkled soil, and the residue was readily brushed from the metal surface.

EXAMPLE 2

A forty percent solution of imidazole in water was applied to a stainless steel plate having the baked-on soil composition of Example 1 thereon, and heated to 300° F. for one hour. Results were similar to those achieved in Example 1.

EXAMPLES 3 AND 4

Twenty-five and ten percent solutions of imidazole in water were each separately applied to stainless steel plates having the baked-on soil of Example 1 thereon, and heated to 225° F., 375° F. and 525° F. for 60 minutes. Best loosening of the soil occurred at 225° F. for both solutions, it being theorized that at the higher temperatures some of the imidazole was lost due to evaporation, thereby reducing the cleaning efficacy thereof.

EXAMPLES 5 AND 6

The following formulations were prepared:

| | Example 5 | Example 6 |
|---|---|---|
| Imidazole | 10.0% | 25.0% |
| Xanthan gum | 0.2% | 0.2% |
| Dowfax TM 2A1 | 0.4% | 0.4% |
| $CaCO_3$ | 6.0% | 6.0% |
| Water | 83.4% | 68.4% |

The formulations were applied to soiled stainless steel plates having the baked-on soil composition of Example 1 thereon, and heated for one hour at 225° F., 375° F., and 525° F. As in Examples 3 and 4, best loosening of the soil occurred at 225° F. At this temperature, both formulations gave excellent removal of the soil. The ease of removal of the residue by physical means such as wiping with sponge, paper towel, scrubbing pad, etc., or by brushing was improved as compared to formulations not containing calcium carbonate.

EXAMPLES 7 AND 8

A fifty percent chicken fat, fifty percent lard soil composition was baked onto six (6) porcelain enameled test trays at 500° F. for 30 minutes.

The following formulations were prepared:

| | Example 7 | Example 8 |
|---|---|---|
| Imidazole | 5.0% | 10.0% |
| Xanthan gum | 0.2% | 0.2% |
| Dowfax TM 2A1 | 0.4% | 0.4% |
| $CaCO_3$ | 6.0% | 6.0% |
| Water | 88.4% | 83.4% |

Each of the formulations was applied (30 g/1000 $cm^2$) to three (3) of the soiled trays as follows:

Condition A: Applied at ambient temperature (about 68° to 77° F.) and left for sixteen (16) hours without heat, in a household oven;

Condition B: Applied at ambient temperature, then heated in oven at 225° F. for fifteen (15) minutes, then allowed to cool;

Condition C: Applied to warm (200° F.) soiled tray, then allowed to cool gradually in oven.

Very good (at least 90%) soil removal was obtained with the formulation containing ten (10) percent imidazole at all three cleaning conditions. The formulation residue could also be easily removed from the surface by brushing. Good (60 to 90%) removal was obtained with the formulation containing five (5) percent imidazole. Ease of removal of the residue was also good.

EXAMPLES 9 AND 10

The following formulations were prepared:

| | Example 9 | Example 10 |
|---|---|---|
| Imidazole | 10.0% | 10.0% |
| Xanthan gum | 0.2% | 0.2% |
| Dowfax TM 2A1 | 0.4% | 0.4% |
| $CaCO_3$ | 6.0% | 4.0% |
| $K_2SO_4$ | — | 2.0% |

The formulations were applied to soiled porcelain enameled test trays, prepared as described in Examples 7 and 8, and evaluated using the three (3) test condition described in Examples 7 and 8 for both soil removal and ease of removing the residue by brushing.

Very good soil removal and ease of residue removal was obtained with the formulation containing the calcium carbonate. However, even better soil removal was obtained with the formulation containing the potassium sulfate and calcium carbonate. The ease of brushing the residue off the tray was also improved. These test results were obtained at all three test conditions.

EXAMPLE 11

The following base formulation was prepared:

| | |
|---|---|
| Xanthan gum | 0.50% |
| Dowfax TM 2A1 | 0.25% |
| $CaCO_3$ | 4.00% |
| $K_2SO_4$ | 2.00% |

There was then added to this base formulaton varying amounts of imidazole and substituted imidazoles as shown in Table 1, and water to total one hundred (100) percent.

The various formulations were applied (30 g/1000 $cm^2$) to soiled porcelain enameled test trays, prepared as described in Examples 7 and 8, and evaluated using the three test conditions described in Examples 7 and 8.

At the end of each treatment, the soil plus the residual formulation was brushed from each treated plate followed by wiping with a damp sponge. The overall degree of cleaning was evaluated according to the following scale:

VG—Very good—at least 90% of treated area cleaned.

G—Good—60-90% of treated area cleaned.

F—Fair—25-60% of treated area cleaned.

P—Poor—some cleaning occurred, but less than 25% of treated area cleaned.

TABLE 1

| | Degree of Cleaning | | |
|---|---|---|---|
| Conditions: | A | B | C |
| 10% Imidazole | VG | VG | VG |
| 7.5% Imidazole | VG | VG | VG |
| 5.0% Imidazole | G | G | G |
| 2.5% Imidazole | F | F | F |
| 10% 1-Methylimidazole | F | P | G |
| 5% 1-Methylimidazole | P | P | G |
| 10% 2-Methylimidazole | VG | VG | VG |
| 5% 2-Methylimidazole | G | G | G |
| 10% 4-Methylimidazole | VG | VG | VG |
| 5% 4-Methylimidazole | G | G | G |
| 10% 1,2-Dimethylimidazole | VG | G | VG |
| 5% 1,2-Dimethylimidazole | P | F | F |
| 10% 2-Ethylimidazole | VG | VG | VG |
| 5% 2-Ethylimidazole | G | G | G |
| 10% 2-Isopropylimidazole | G | VG | VG |
| 5% 2-Isopropylimidazole | P | F | F |
| 10% 2-Ethyl-4-Methylimidazole | VG | VG | VG |
| 5% 2-Ethyl-4-Methylimidazole | F | G | G |

EXAMPLE 12

A soil composition containing 120 g. ground beef, 58 g. cheddar cheese, 120 ml. milk, 110 g. sugar, 120 ml. cherry juice, 19 g. tapioca, 1 egg, 15 g. flour and 120 ml. tomato juice was prepared by mixing with a hand mixer (low speed) for 3 minutes. The soil was baked onto a porcelain enameled test tray at 450° F. for 60 minutes. After cooling, imidazole was applied to the soil, and the plate heated to 300° F. for 60 minutes. The results obtained were similar to those achieved in Example 1.

EXAMPLES 13 TO 17

The procedure of Example 1 is repeated, except that 2-phenylimidazole, 4-phenylimidazole, benzimidazole, pyrazole and 3-methylpyrazole are each separately substituted for imidazole. At least fair (25-60%) soil removal is accomplished in each instance.

EXAMPLES 18 AND 19

The following two (2) formulations were prepared:

| | Example 18 | Example 19 |
|---|---|---|
| Imidazole | 25.0% | 25.0% |
| Keltrol ® | 0.4% | — |
| Veegum | — | 10.0% |
| Water | 74.6% | 65.0% |

Both formulations were tested for their ability to remove a variety of organic coatings from surfaces as follows:

The following twelve (12) coatings were each brushed or sprayed on one (1) wood and one (1) metal surface test panel according to label directions. The twenty-four (24) test panels were then dried overnight, and aged for eight (8) hours at 100° C. in an air circulation oven.

Coatings

1. McCloskey TM —Clear Varnish #0092 Gloss
2. McCloskey TM —Gloss Polyurethane #1195
3. Rust-Oleum TM —Gloss White #7792
4. Sears TM —Interior/Exterior White Enamel #30-69954
5. Sears TM —Easy Living Flat Interior Latex #30-91444
6. Sears TM —Easy Living Semi-Gloss Interior Latex #30-78114
7. Sears TM —Gloss Enamel (White) #30-69324
8. Sears TM —High Gloss Enamel (Cherry Red) #30-67524
9. Krylon TM —Spray Enamel (Cherry Red) #2101
10. Krylon TM —Spray Enamel (Flat Black) #1602
11. Dupli-Color TM —Automotive Touch Up Paint #DS-GM-301
12. Revlon TM —Nail Enamel To 25 $cm^2$ of each of the so prepared test panels was then uniformly applied about 5 grams of each fomulation, above, at room temperature (about 21° C.).

For coatings 1 through 10, wrinkles began appearing in the tested areas after about 1 hour. The entire treated area wrinkled within about 4 hours, and the treated area was easily wiped clean.

For coating 11, bubbles developed in the treated area, and about 25% of the treated area was brushed clean.

For coating 12, after two (2) hours, all polish on the treated area was easily removed by washing with water.

EXAMPLES 20 TO 23

The procedure of Examples 18 and 19 is repeated, except that 3-methylpyrazole and pyrazole are separately substituted for the imidazole. Substantial removal of the twelve (12) coatings from both wood and metal surface test panels is accomplished.

For purposes of complying with the best mode requirement, reference is made to co-pending, commonly assigned U.S. patent application No. 555,808, filed Nov. 28, 1983, now U.S. Pat. No. 4,477,288 the disclosure of which is hereby incorporated by reference, and to the following Examples 24 to 27:

EXAMPLES 24 TO 27

| | 24 | 25 | 26 | 27 |
|---|---|---|---|---|
| Keltrol | 0.10 | 0.11 | 0.10 | 0.11 |
| Veegum K | 1.50 | 1.65 | 1.50 | 1.65 |
| Imidazole | 3.00 | 3.00 | 3.00 | 3.00 |
| Dowanol EPH | 2.00 | 4.00 | 2.00 | 2.00 |
| D-Limonene | 3.00 | 3.00 | 3.00 | 3.00 |
| Calcium Carbamate | 1.00 | 1.00 | — | — |
| Potassium Sulfate | 1.00 | 1.00 | — | — |
| Sorbitol | 2.00 | 2.00 | — | 2.00 |
| Potassium Carbonate | 3.00 | 3.00 | 3.00 | 3.00 |
| Urea | — | 3.00 | — | 3.00 |
| Aerosol OT-75 | — | 0.10 | — | — |
| Dowfax 2A-1 | — | — | 0.11 | 0.11 |
| Deionized Water | balance | balance | balance | balance |

What is claimed is:

1. A method for facilitating the removal of undesirable organic matter from a surface which comprises contacting said organic matter, with a substantially loosening effective amount of an active ingredient consisting essentially of from 1 to 25% by weight of a compound selected from imidazole, pyrazole, an alkyl or aryl substituted imidazole, an alkyl or aryl substituted pyrazole, or a mixture of two or more thereof, in the substantial absence of an alkali metal hydroxide, for a time sufficient to effect a substantial loosening of said organic matter and wherein said compound is in liquid form at use temperature.

2. The method according to claim 1 wherein the compound is applied to said organic matter in dry form and the method is performed in the presence of heat to at least a temperature at which the compound is rendered liquid.

3. The method according to claim 1 wherein the organic matter-containing surface is first heated to a temperature above the melting point of the compound and the compound is then applied thereto.

4. The method according to claim 1 wherein the compound is applied to said organic matter in a liquid form.

5. The method according to claim 4 wherein the liquid form is a solution.

6. The method according to claim 1 wherein the compound is imidazole, 2-methylimidazole, 4-methylimidazole, 1,2-dimethylimidazole, 2-ethylimidazole, 2-ethyl-4-methylimidazole, 2-isopropylimidazole, or a mixture of two or more thereof.

7. The method according to claim 1 wherein the compound is imidazole.

8. The method according to claim 1 wherein the organic matter is food soil and the surface is an oven surface.

9. The method according to claim 1 wherein the method is performed in the presence of heat after application of said compound.

* * * * *